United States Patent [19]

Irven

[11] 4,116,653

[45] Sep. 26, 1978

[54] OPTICAL FIBER MANUFACTURE

[75] Inventor: John Irven, Bishops Stortford, England

[73] Assignee: International Standard Electric Corporation, New York, N.Y.

[21] Appl. No.: 815,461

[22] Filed: May 9, 1977

Related U.S. Application Data

[63] Continuation of Ser. No. 699,749, Jun. 24, 1976, abandoned.

[30] Foreign Application Priority Data

Jul. 4, 1975 United Kingdom ................ 28396/75

[51] Int. Cl.² .............................................. C03B 37/00
[52] U.S. Cl. ........................................ 65/2; 65/3 A; 65/13; 65/31; 65/DIG. 7; 350/96.10; 427/163
[58] Field of Search ................ 65/2, 13, 3 A, DIG. 7, 65/31, 30 R; 350/96 WG; 427/163

[56] References Cited

U.S. PATENT DOCUMENTS

| | | | |
|---|---|---|---|
| 3,737,293 | 6/1973 | Maurer | 65/3 A |
| 3,823,995 | 7/1974 | Carpenter | 65/3 A X |
| 3,938,974 | 2/1976 | Macedo et al. | 65/3 A |
| 3,980,459 | 9/1976 | Li | 65/3 A X |

FOREIGN PATENT DOCUMENTS 2,434,717  3/1975  Fed. Rep. of Germany ............ 65/3 A

*Primary Examiner*—Robert L. Lindsay, Jr.
*Attorney, Agent, or Firm*—John T. O'Halloran; Peter C. Van Der Sluys

[57] ABSTRACT

High numerical aperture optical fibers are produced by the chemical vapor deposition of core material on the inner surface of a borosilicate glass tube and collapsing and drawing the tube into a fiber.

6 Claims, 1 Drawing Figure

OPTICAL FIBER MANUFACTURE

This is a continuation, of application Ser. No. 699,749, filed June 24, 1976 now abandoned.

FIELD OF THE INVENTION

This invention relates to the manufacture of glass optical fiber.

BACKGROUND OF THE INVENTION

A conventional method of making low loss multi-component glass fiber involves drawing fiber from a double crucible whose inner crucible is charged with core glass and whose outer crucible is charged with cladding glass. Contamination of the melts is usually the factor that limits the ultimate transmissivity of fiber produced by this method. This method is however not suitable for the manufacture of fused silica fiber on account of the high melting point of silica. For the manufacture of fused silica fiber an alternative method has been disclosed involving the chemical vapor deposition of a doped silica upon the bore of a fused silica tube. This method has the advantage that the core glass is prepared in situ, and can be prepared in particularly pure form. However it has the disadvantage that the numerical aperture and the core to cladding diameter ratio of the resulting fiber is restricted in comparison with that of multicomponent glass fiber obtainable with the double bushing method. This is primarily because the doping concentration for the deposited layer, in relation to the thickness of that layer, is restricted in order to prevent too great a mismatch in thermal expansion between the doped material of the deposited layer and the underlying fused silica tube. Pure fused silica has a particularly low thermal expansion compared with most other glass systems, and too large a mismatch causes cracks.

SUMMARY OF THE INVENTION

According to the present invention there is provided a method of making glass optical fiber wherein the optical energy guiding layer or layers of the fiber are deposited by chemical vapor deposition upon the bore of a self-supporting tubular multicomponent glass substrate which is subsequently collapsed and drawn into fiber.

Preferably the self-supporting tubular substrate is made of a high silica content borosilicate glass having a softening temperature of 1200 – 1300° C as this allows the deposited layers to be deposited by one of a variety of possible oxidation reactions. Typically these high silica content glasses contain about 96% silica and can be made by heat treating an initially high silica content borosilicate glass of lower softening point to promote phase separation into two continuous phases, one of which is a high softening point phase rich in silica, and the other a lower softening point phase rich in sodium borate. The second phase is leached away, and then the residue is heat treated to consolidate it. The glass that is produced by this process has a larger coefficient of thermal expansion than that of silica. This can further be augmented, but at the expense of reducing the softening temperature, by doping the residue obtained by leaching. This residue is porous and hence a salt, typically a carbonate or nitrate, can be caused to crystallize from solution in its pores. The consolidation treatment first converts this salt to the oxide which then becomes incorporated into the glass.

If only one layer is to be deposited, this is a high refractive index layer which forms the core material of the finished optical fiber, while the substrate provides its lower refractive index cladding. Normally, however, it is preferred to deposit a first low refractive index cladding layer and then the layer of core glass. One reason is that the deposited cladding layer can usually be made less optically lossy than the substrate material. A second reason is that the cladding layer can usually be made of a material, having a lower refractive index than the substrate material and is some circumstances this can enable the construction of a fiber of a higher numerical aperture.

DESCRIPTION OF THE PREFERRED EMBODIMENT

Figure 1:
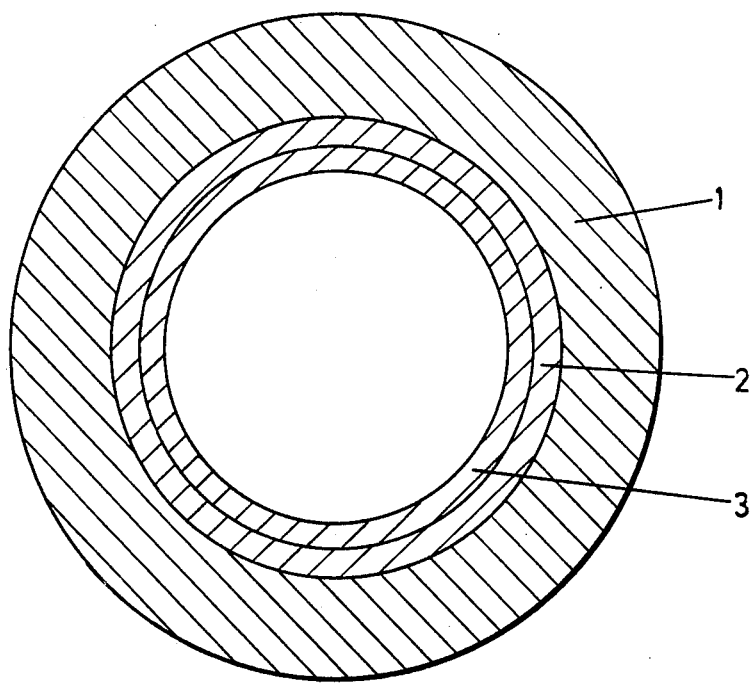
FIG. 1 is a cross-sectional view through the substrate after the deposition of two layers upon its bore.

In a preferred embodiment of the present invention a 10 mm bore tube 1, as shown in FIG. 1, typically about 100 cm long, is used as a substrate upon which to deposit two layers 2 and 3 from the vapor phase. The tube, which is made of the consolidated leached high silica glass previously referred to, is first heated to around 1000° C to drive off any remaining volatiles, and then a layer 2 of lower refractive index glass of substantially matched coefficient of thermal expansion is deposited upon its bore. The chosen deposition reaction is a thermally induced oxidation reaction from which hydrogen and its compounds are excluded so as to preclude the formation of -OH groups in the deposited layer as these are undesirable for many applications in view of the optical absorption bands that they produce. Separate gas streams of dry oxygen are bubbled through silicon tetrachloride, boron tribromide, and arsenic trichloride, each maintained at ambient room temperature at the rates of 100 ml/min, 50 ml/min and 10 ml/min respectively. The gas streams are blended, and then passed through the deposition tube where they react to produce a glassy deposit of silica doped with oxides of boron and arsenic. This reaction is confined to the hot zone of a short furnace which encircles the tube and is slowly traversed repeatedly along substantially the whole length of the tube in order to provide a uniform coating. This reaction can be performed by heating the tube to a temperature in the range 1000° – 1200° C. When a sufficient thickness has been built up, typically about 100 $\mu$m, the higher refractive index layer 3 is deposited by a similar reaction involving similar temperatures. In this second reaction two further gas streams of dry oxygen are involved, one at 10 ml/min through phosphorus oxychloride, and the other a 50 ml/min through germanium tetrachloride. The germanium tetrachloride is at room temperature, but the phosphorus oxychloride is preferably hotter, typically being maintained at about 50° C. The rates of flow through the silicon tetrachloride and the arsenic trichloride are unchanged, but that through the boron tribromide is reduced to 20 ml/min. The formation of resulting layer 3, which has a coefficient of thermal expansion substantially matched with that of the underlying layer 2, is terminated when it has reached a suitable thickness typically in the range 100 – 200 $\mu$m.

An advantage of incorporating boric, arsenic and phosphorus oxides in the deposited layers is that they held to reduce both the oxidation reaction termperature and the temperature at which the oxide reaction product is deposited as a glassy layer rather than a particulate one.

After the deposition of the two layers the tube is removed from the deposition apparatus and mounted in a lathe. It is rotated in the lathe while a hot zone provided by a flame or a furnace is traversed along the tube causing its bore to collapse. The resulting optical fiber preform is then removed from the lathe and transferred to drawing apparatus for drawing down into fiber.

It is to be understood that the invention is applicable not only to the conventional core/cladding construction of optical fiber but also to special configurations such as the W and O optical waveguide configurations of optical fiber, and the graded index configuration. In the case of manufacturing graded index fiber, the relative proportions of the reagents are changed between each traverse while depositing any material that is required to have a radially graded refractive index profile.

It is to be understood that the foregoing description of specific examples of this invention is made by way of example only and is not to be considered as a limitation on its scope.

What is claimed is:

1. A method of making a glass optical fiber, comprising the steps of:

treating a hollow tube of high silica content borosilicate glass to promote phase separation into two continuous phases, the first phase consisting of a high softening point phase rich in silica and the second phase consisting of a lower softening point phase rich in sodium borate;

removing the second phase by leaching to provide a plurality of pores in said glass;

heat treating the remaining first phase of the glass to consolidate the first phase to form a self-supporting hollow tubular glass substrate;

depositing by a chemical vapor deposition reaction at least one layer of optical energy guiding glass upon the internal bore of the tubular substrate; and collapsing and drawing said tubular substrate into an optical fiber.

2. A method as described in claim 1 wherein the deposition reaction used to produce at least one layer is an oxidation reaction from which hydrogen and hydrogen containing compounds are excluded.

3. A method as described in claim 1 wherein the chemical vapor deposition reaction includes a first reaction producing silica doped with one or more oxides selected from the group consisting of boron and arsenic and a second reaction producing silica doped with one or more oxides selected from the group consisting of phosphorus and germanium.

4. A method as claimed in claim 1 wherein after the removal of the second phase, and before the heat treatment, a salt is caused to crystallize in the pores formed in the first phase said salt being converted by the subsequent heat treatment into an oxide incorporated into the material of the tubular substrate.

5. A method as claimed in claim 1 wherein a succession of layers is deposited upon the bore and the composition of the layers is graded such that the drawn fiber is a graded index fiber.

6. A method as claimed in claim 5 wherein the composition of the deposited layers are such that the drawn fiber is a step index fiber.

* * * * *